No. 769,260. PATENTED SEPT. 6, 1904.
S. M. FORD.
HARROW.
APPLICATION FILED DEC. 3, 1903.
NO MODEL. 2 SHEETS—SHEET 2.
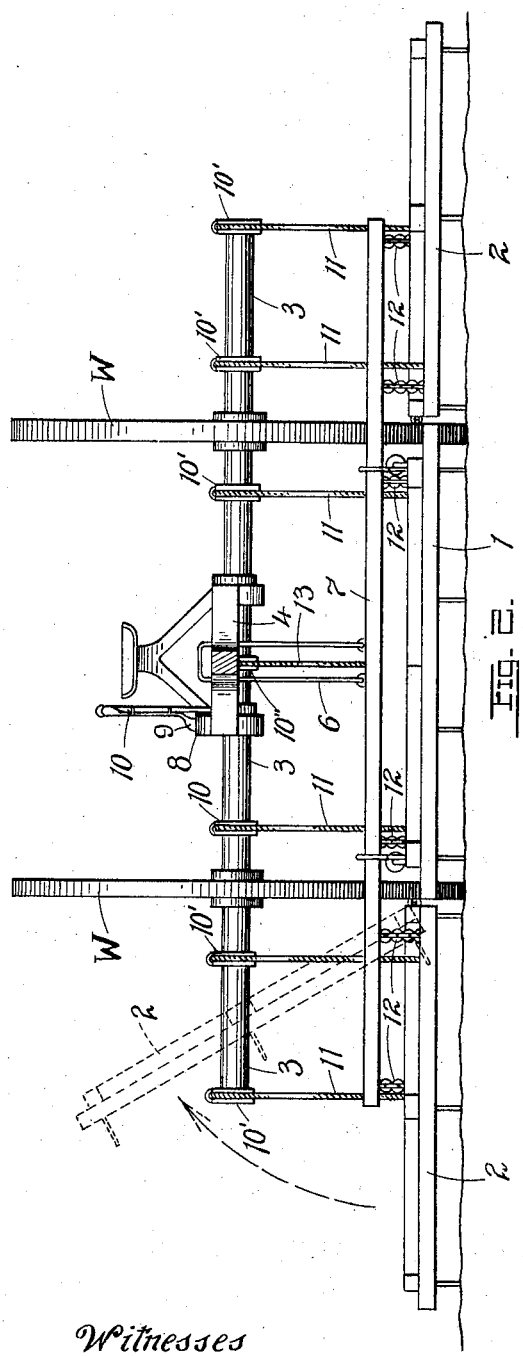
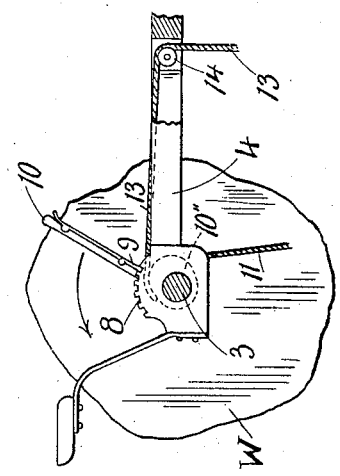
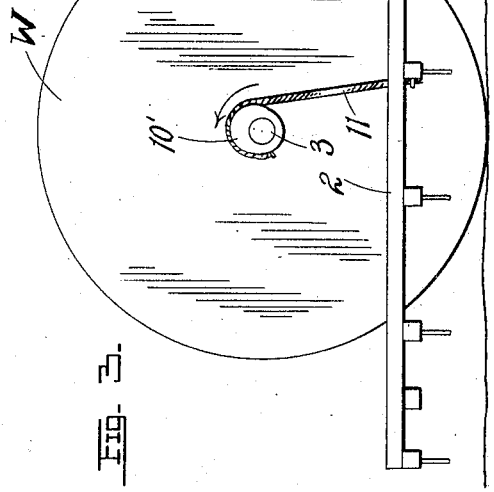
Witnesses
Inventor
Samuel M. Ford
By Emil Pearek
Attorney No. 769,260. Patented September 6, 1904.

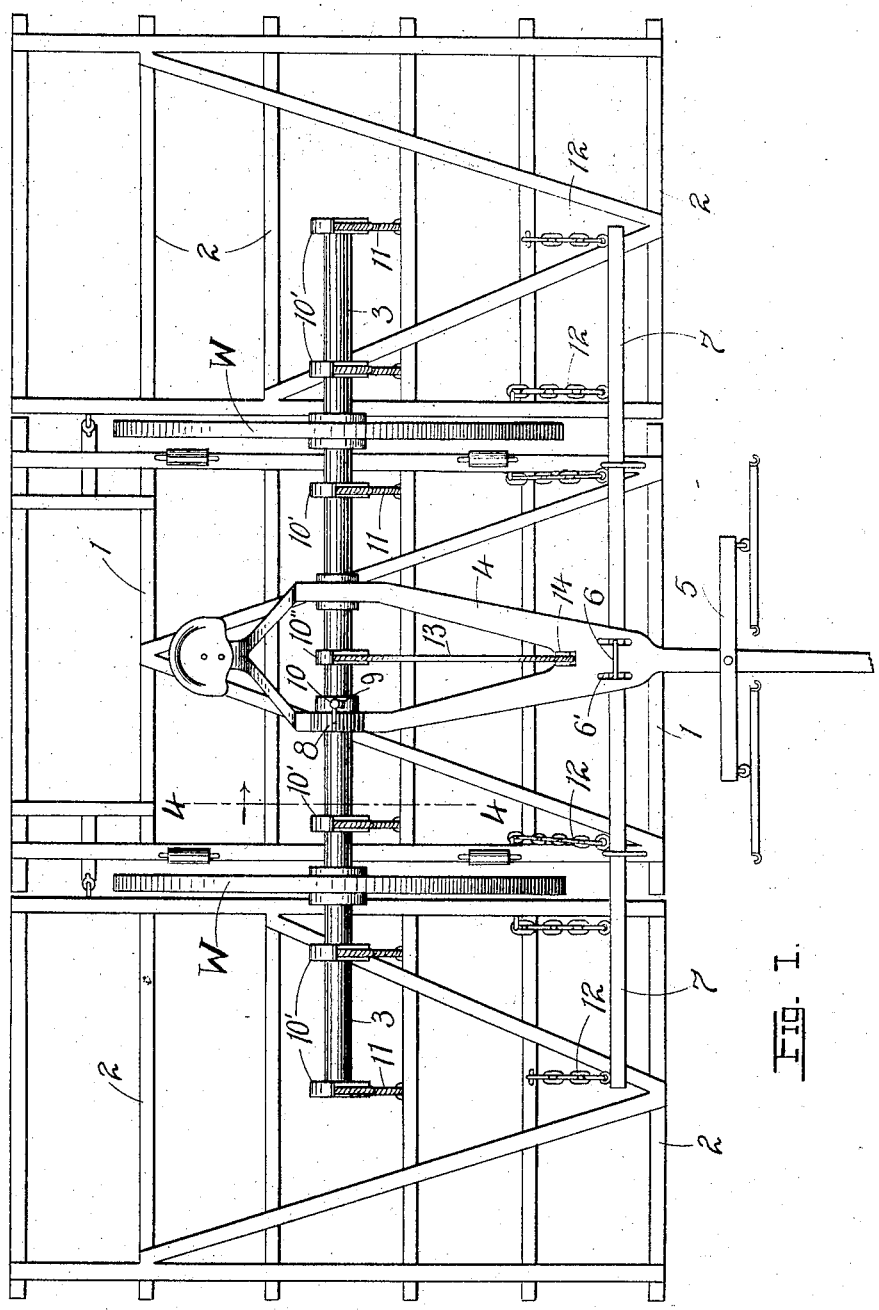

UNITED STATES PATENT OFFICE.

SAMUEL M. FORD, OF FLORA, ILLINOIS.

HARROW.

SPECIFICATION forming part of Letters Patent No. 769,260, dated September 6, 1904.

Application filed December 3, 1903. Serial No. 183,622. (No model.)

*To all whom it may concern:*

Be it known that I, SAMUEL M. FORD, a citizen of the United States, residing at Flora, in the county of Clay and State of Illinois, have invented certain new and useful Improvements in Harrows, of which the following is a full, clear, and exact description, reference being had to the accompanying drawings, forming a part hereof.

My invention has relation to improvements in harrows; and it consists in the novel construction of harrow more fully set forth in the specification and pointed out in the claim.

In the drawings, Figure 1 is a top plan view of the harrow. Fig. 2 is a front elevation. Fig. 3 is a side elevation showing harrow raised off the ground, and Fig. 4 is a section on line 4 4 of Fig. 1.

The object of my invention is to construct a harrow of a suitable number of sections coupled to one another by hinged connections whereby the harrow may be extended laterally, and thus operate over a maximum area of ground passed over.

A further object is to provide means for disengaging one or more of the sections from the ground, so that the machine may pass over the ground without performing any work. To this end I have devised a harrow which in detail may be described as follows:

Referring to the drawings, 1 represents the inner or middle section of the harrow, on either side of which are hinged the outer sections 2 2, the connection being effected in any suitable mechanical manner. The adjacent ends of the center and outer sections are spaced sufficiently apart to allow for the free passage of the running wheels W, the latter revolving freely about a rock-shaft 3, passing loosely through the pole-frame 4, on either side of which the draft-horses are disposed. The animals are coupled to the swingletrees 5, carried along the front end of the pole-frame, said pole-frame being, moreover, connected to the forward end of the section 1 by a yoke 6, passing loosely through suitable slots 6' of the frame, the arms of the yoke being connected to a transverse bar 7, forming a part of or carried by the middle section. The rear of the pole-frame carries the seat. The frame 4 is forked, one of the arms of the fork being provided with a rack-segment 8, with which there coöperates a pawl 9, carried by a lever 10, rigidly secured to the rock-shaft 3.

Disposed along the rock-shaft 3 are a series of grooved cams or drums 10', over which are adapted to wind the chains or ropes 11, connected, respectively, to the peripheries of the cams and to the several sections constituting the harrow. The length of the shaft 3 is such as to project to a point approximately over the middle of the outer sections. Upon rocking the shaft in one direction the pawl engages the toothed rack 8, the cams winding up the chains 11 sufficiently to elevate the harrow from the ground when occasion arises to discontinue its use. A reverse movement of course drops the harrow to the ground.

The extensions or outer sections 2 2 may be folded up sufficiently to clear the ground when necessary to pass through a gate of insufficient width to allow for the passage therethrough of the several sections extended. (See dotted position of one of the terminal sections in Fig. 2.) The several sections are additionally secured to the transverse bar 7 by chains 12, and the central cam 10'', carried by the rock-shaft between the forked ends of the pole-frame, is coupled to the bar 7 by a chain 13, passing over a guide-roller 14 at the base of the fork. In this way the several sections are raised and lowered in perfect parallelism.

I do not, of course, wish to be limited to the precise details here shown, as they may in a measure be departed from without in any wise affecting the nature or spirit of my invention.

Having described my invention, what I claim is—

A harrow comprising a central section, lateral sections hinged thereto, running wheels located between the ends of the adjacent sections, a rock-shaft passing loosely through the center of the wheels and extending to points over the middle of the lateral sections, a forked pole-frame loosely embracing the shaft between the wheels, a rack formed on one of the arms of the frame, a lever rigidly secured to the shaft, a pawl on said lever engaging the rack, a series of cams disposed along the shaft and having chains leading from their peripheries to the sections of the harrow, a cam located between the arms of the fork of the pole, a guide-roller at the base of the fork, a chain connecting said last-mentioned cam to the front of the middle section and passing over to the said roller, a transverse bar disposed along the front of the middle section and extending over the lateral sections, and chain connections between said bar and said lateral sections, substantially as set forth.

In testimony whereof I affix my signature in presence of two witnesses.

SAMUEL M. FORD.

Witnesses:
  JOSEPH E. DAY,
  J. BOWMAN.